US005409524A

United States Patent [19]
Jensvold et al.

[11] Patent Number: 5,409,524
[45] Date of Patent: Apr. 25, 1995

[54] MEMBRANES HAVING IMPROVED SELECTIVITY AND RECOVERY, AND PROCESS FOR MAKING SAME

[75] Inventors: John A. Jensvold, Benicia; Srikanth R. Chary, Fremont, both of Calif.; Wendy S. Jacks, Indianapolis, Ind.; Hans R. Keller, Concord, Calif.; Theodore L. Parker, Alpharetta, Ga.; Damoder Reddy, Walnut Creek, Calif.

[73] Assignee: The Dow Chemical Company, Midland, Mich.

[21] Appl. No.: 119,800

[22] Filed: Sep. 10, 1993

Related U.S. Application Data

[63] Continuation-in-part of Ser. No. 989,159, Dec. 1, 1992, abandoned.

[51] Int. Cl.6 .................................................. B01D 53/22
[52] U.S. Cl. ............................................ 96/8; 95/45; 96/13; 96/14; 55/DIG. 5
[58] Field of Search .................. 95/45, 47, 49, 51, 54; 96/4, 7–14; 55/524, 528, DIG. 5

[56] References Cited

U.S. PATENT DOCUMENTS

| | | | |
|---|---|---|---|
| 4,440,643 | 4/1984 | Makino et al. | 210/500.2 |
| 4,634,530 | 1/1987 | Kuder et al. | 210/500.23 |
| 4,655,807 | 4/1987 | Ohmori et al. | 55/522 |
| 4,689,267 | 8/1987 | Takamizawa et al. | 428/376 |
| 4,759,776 | 7/1988 | Langsam et al. | 95/51 |
| 4,764,320 | 8/1988 | Chau et al. | 264/41 |
| 4,772,392 | 9/1988 | Sanders, Jr. et al. | 210/500.23 |
| 4,818,254 | 4/1989 | Anand et al. | 95/54 |
| 4,837,386 | 6/1989 | Puri | 204/157.61 |
| 4,838,904 | 6/1989 | Sanders, Jr. et al. | 96/10 |
| 4,840,646 | 6/1989 | Anand et al. | 95/54 |
| 4,843,733 | 7/1989 | Admassu | 34/9 |
| 4,851,014 | 7/1989 | Jeanes | 95/51 |
| 4,859,215 | 8/1989 | Langsam et al. | 95/51 |
| 4,874,401 | 10/1989 | Jeanes | 95/51 |
| 4,881,954 | 11/1989 | Bikson et al. | 95/54 |
| 4,882,057 | 11/1989 | Morgan et al. | 210/500.23 |
| 4,900,334 | 2/1990 | Admassu et al. | 95/54 |
| 4,900,502 | 2/1990 | Babcock et al. | 264/346 |
| 4,919,856 | 4/1990 | Anazawa et al. | 264/22 |
| 4,931,182 | 6/1990 | Burgoyne, Jr. et al. | 210/500.39 |
| 4,952,220 | 8/1990 | Langsam et al. | 96/13 |
| 4,955,993 | 9/1990 | Sanders, Jr. et al. | 95/54 |
| 4,959,082 | 9/1990 | Admassu et al. | 95/54 |
| 4,962,131 | 10/1990 | Beck et al. | 521/51 |
| 4,963,266 | 10/1990 | Morgan et al. | 210/640 |
| 4,975,228 | 12/1990 | Sanders, Jr. et al. | 264/41 |
| 4,976,897 | 12/1990 | Callahan et al. | 264/22 |
| 5,011,518 | 4/1991 | Ogawa | 210/500.36 X |
| 5,042,993 | 8/1991 | Meier et al. | 95/47 |
| 5,045,093 | 9/1991 | Meier et al. | 95/47 |
| 5,073,175 | 12/1991 | Anand et al. | 95/51 |
| 5,102,552 | 4/1992 | Callahan et al. | 210/654 |
| 5,141,530 | 8/1992 | Jensvold et al. | 264/41 X |

FOREIGN PATENT DOCUMENTS

| | | |
|---|---|---|
| 0321241 | 6/1989 | European Pat. Off. . |
| 0215010 | 10/1984 | Germany . |
| 60-206403 | 10/1985 | Japan . |
| 60-257807 | 12/1985 | Japan . |
| 61-103505 | 5/1986 | Japan . |
| 61-242608 | 10/1986 | Japan . |
| 62-136212 | 6/1987 | Japan . |
| 63-278526 | 11/1988 | Japan . |
| 63-310622 | 12/1988 | Japan . |
| 1-030620 | 2/1989 | Japan . |
| 1-067210 | 3/1989 | Japan . |
| 2-241529 | 9/1990 | Japan . |
| 3-000087 | 1/1991 | Japan . |
| 3-004925 | 1/1991 | Japan . |

*Primary Examiner*—Robert Spitzer

[57] ABSTRACT

The invention is a process for obtaining membranes having improved selectivity and recovery using a combination of heat treating and UV irradiation.

16 Claims, No Drawings

MEMBRANES HAVING IMPROVED SELECTIVITY AND RECOVERY, AND PROCESS FOR MAKING SAME

This is a continuation-in-part of Ser. No. 07/989,159, filed Dec. 1, 1992, now abandoned.

The invention relates to gas separation membranes having improved selectivity and recovery, and a process for making same.

Gas separation membranes have been used for some time to separate a number of gases from gas mixtures. A tradeoff typically exists between selectivity and permeability. Membranes which possess high permeabilities generally have low selectivities, while membranes which possess high selectivities generally have low permeabilities.

For example, in the separation of oxygen from nitrogen, while some membranes have been reported in the literature to have oxygen/nitrogen selectivities of 3 to 8, the corresponding permeabilities are only in the range of from 100 to 0.1 barrers. Thus, the recovery, that is, the ratio of the volume of non-permeate product gas to the volume of feed gas, of such membranes is low, which limits the economic usefulness of such membranes, particularly when a high purity non-permeate product such as 99 percent nitrogen is desired.

What is needed is a membrane which possesses both high selectivity and moderate to high permeability. Particularly as higher purity non-permeate product gas is required, membranes possessing high recovery are needed. If permeability can be maintained, membranes with higher Selectivities are capable of achieving a higher recovery at a given non-permeate concentration or purity than membranes with lower selectivities. What is therefore needed is a process for increasing the selectivities of membranes which have moderate selectivities and moderate permeabilities, without a corresponding significant decrease in permeabilities, so that high recoveries can be obtained.

SUMMARY OF THE INVENTION

The invention is a process for treating a gas separation membrane to improve its selectivity, comprising:

A. first heating a membrane comprising a polymer having a UV excitable site and a labile protonic site in the polymeric backbone, such that a covalent bond may be formed between said sites, at a temperature between about 60° and 300° C. for a time sufficient to relax excess free volume in the polymer; and B. then irradiating the membrane with a UV radiation source in the presence of oxygen for a time sufficient to surface oxidize the membrane to obtain a treated membrane;

wherein the treated membrane exhibits at least a 10 percent increase in Selectivity with less than a 60 percent decrease in permeability compared to the untreated membrane.

The invention includes membranes prepared from the above-described process. Such membranes possess improved selectivity and recovery compared to untreated membranes.

DETAILED DESCRIPTION OF THE INVENTION

Membranes useful in this invention include those derived from polymers containing a UV excitable site and a labile protonic site in the polymeric backbone such that a covalent bond may be formed between said sites.

While not wishing to be bound by any particular theory, it is believed that the improvement obtained in selectivity after exposure to heat and UV irradiation is related to the presence of hydrogen atom donors and to the ease of hydrogen atom abstraction by a UV excitable site to form free radical species in the presence of molecular oxygen. Generally, the more readily a hydrogen atom is removed, the better the efficacy of the heat and UV irradiation treatment should be and the concomitant improvement in selectivity expected. In a thermodynamic sense, the lower the bond dissociation energy, the more readily the hydrogen atom may be abstracted. In general, benzylic and allylic hydrogens are more easily removers, followed by tertiary, then secondary, and finally primary and aromatic hydrogens. Additionally, hydrogen atoms bonded to carbon atoms that are alpha to a carbonyl group or an ether group are also readily abstracted. It is also believed that some degree of interchain bonding or cross-linking may occur by reaction of the free radical species generated. In determining which types of polymer structures would be expected to give favorable improvements in membrane selectivity after exposure to heat and UV irradiation, two factors must be considered: (1) the type and number of hydrogen atom donor functions present, and (2) the type and number of groups or structures capable of absorbing the UV radiation and efficiently producing free radical species.

Membranes useful in the process of this invention include those which are derived from polymers containing hydrogen atom dionor sites and structures capable of absorbing the UV irradiation including carbon/-hetero atom double bonds such as keto, ester, carbonate, amide, sulfoxyl, sulfonyl, and nitro moieties, aromatic/conjugated double bonds such as C=N6 and pairs of highly polarizing groups (electron donating/accepting) such as —R, —OR, and —SR, and —CN, nitro, sulfonic, carboxylic, ester, and halogen.

Preferably, the membrane comprises an unsubstituted or substituted polycarbonate, polyestercarbonate, polyester, polystyrene, polysulfone, polyethersulfone, polyether, polyarylester (polyarylate), polyethylene terephthalate, cellulose ester, polybenzazole, polyurethane, or copolymer or physical blend thereof. More preferably, the membrane comprises an unsubstituted or substituted polycarbonate, polybenzazole, polyestercarbonate, polyester, polysulfone, polyethersulfone, polyether, polyarylester (polyarylate), or copolymer or physical blend thereof. Even more preferably, the membrane comprises a polymer having in general a rigid structure such as a polybenzazole or a polymer containing 9,9-bis(3,5-dibromo-4-hydroxyphenyl)fluorene, 9,9-bis(3,5-dichloro-4-hydroxyphenyl)fluorene, hexafluorobisphenol A, tetrahalohexafluorobisphenol A, or tetraalkylhexafluorobisphenol A moieties selected from the group consisting of polyether, polysulfone, polyethersulfone, polyarylester (polyarylate), polyester, polyestercarbonate, polycarbonate, and copolymers and physical blends thereof.

Polybenzazole (PBZ) as used herein means a polybenzazole polymer selected from the group of polybenzoxazoles and polybenzobisoxazoles (PBO), polybenzothiazoles and polybenzobisthiazoles (PBT), and polybenzimidazoles or polybenzobisimidazoles (PBI). The term polybenzoxazole (PBO) refers broadly to polymers in which each mer unit contains an oxazole ring bonded to an aromatic group, which need not necessarily be a benzene ring. The term polybenzoxazole (PBO) also refers broadly to poly(phenylene-benzobisoxazole)s and other polymers wherein each mer unit comprises a plurality of oxazole rings fused to an aromatic group. Similar meanings shall apply to the terms polybenzothiazole (PBT) and polybenzimidazole (PBI). Hexafluorobisphenol A as used herein means bisphenol A wherein all six of the hydrogens on the isopropylidene bridging group have been substituted with fluorine moieties. Tetrahalo or tetraalkyl as used herein with respect to bisphenol A means bisphenol A wherein four of the eight hydrogens on the aromatic rings are substituted with halo or alkyl moieties respectively.

The preparation of such membranes is known to one skilled in the art. See, for example, U.S. Pat. Nos. 3,350,844; 3,709,774; 3,852,388; 3,899,309; 4,468,500; 4,468,501; 4,468,502; 4,468,503; 4,717,393; 4,717,394; 4,772,392; 4,818,254; 4,838,904; 4,840,646; 4,851,014; 4,874,401; 4,880,699; 4,929,405; 4,949,775; 4,955,993; 4,971,695; 4,978,573; 5,000,763; 5,007,945; 5,009,679; 5,013,332; 5,034,026; 5,034,027; 5,042,992; and 5,042,993; incorporated herein by reference.

The membranes may have morphological structures which are non-porous, asymmetric (anisotropic), or composite. Non-porous membrane as used herein means a membrane which is dense, that is, substantially free of holes or voids. Asymmetric membrane as used herein means a membrane which possesses at least one discriminating region and at least one porous region, wherein the discriminating and porous regions comprise the same polymer. Composite membrane as used herein means a membrane which possesses at least one discriminating layer and at least one porous layer, wherein the discriminating and porous layers comprise different polymers.

The membranes may be in the configuration of hollow fibers or tubes, or films or flat sheets.

The membranes are first treated by heating the membrane to relax excess free volume in the polymer. The heating temperature is preferably between about 60° and 300° C., more preferably between about 100° and 250° C., even more preferably between about 150° and 230° C. The optimum heating temperature for a given polymer is in the range of Tg—200° C. to Tg—50° C., wherein Tg is the glass transition temperature of the polymer. The heating time is preferably between about 0.5 and 24 hours, more preferably between about 0.5 and 12 hours, even more preferably between about 0.5 and 4 hours.

The membranes are then irradiated with UV radiation in the presence of oxygen such that the surface is at least partially oxidized. A UV source having radiation wavelengths between about 180 and 400 nanometers is preferred, between about 200 and 375 nanometers is more preferred. The exposure time is preferably between about, 1 and 90 minutes, more preferably between about 3 and 80 minutes, even more preferably between about, 5 and 60 minutes. In general, preferred UV irradiation times for composite and asymmetric membranes are significantly shorter than for homogeneous (dense) membranes for a given polymer.

The treated membranes preferably possess an increase in selectivity of at least about 10 percent compared to the untreated membrane for at least one gas pair selected from the group consisting of oxygen/nitrogen, carbon dioxide/methane, hydrogen/light hydrocarbon, helium/methane, and nitrogen/methane. The treated membranes more preferably possess an increase in selectivity of at least about 30 percent compared to the untreated membrane for at least one gas pair selected from the group consisting of oxygen/nitrogen, carbon dioxide/methane, hydrogen/light hydrocarbon, helium/methane, and nitrogen/methane. The treated membranes preferably possess a selectivity for oxygen/nitrogen at 30° C. of at least about 6, more preferably of at least about 7.5, even more preferably at least about 9.

The treated membranes preferably exhibit a decrease in permeability of less than about 60 percent compared to the untreated membrane, more preferably of less than about 40 percent compared to the untreated membrane, even more preferably of less than about 25 percent compared to the untreated membrane, for at least one gas selected from the group consisting of helium, oxygen, nitrogen, carbon dioxide, methane, hydrogen, and a light hydrocarbon. The treated membranes preferably possess an oxygen permeability of at least about 0.3 barrers, more preferably of at least about 0.5 barrers, even more preferably of at least about 1.0 barrers.

The treated membranes may be fabricated into hollow fiber, tubular, spiral wound, or plate and frame devices by methods known in the art. For example, see U.S. Pat. Nos. 3,228,876; 3,422,008; 4,781,834; 4,871,379; 4,880,440; 4,881,955; 4,929,259; 4,961,760; 5,013,331; 5,013,437; 5,034,126; 5,043,067; 5,096,584; incorporated herein by reference.

The membranes of this invention are useful for separating one or more gases from gas mixtures, including mixtures comprising hydrogen, helium, oxygen, nitrogen, air, argon, carbon monoxide, carbon dioxide, ammonia, water vapor, light hydrocarbons, natural gas, hydrogen sulfide, nitrogen oxides, sulfur oxides, and/or organic vapors. Light hydrocarbons as used herein means saturated and unsaturated $C_{1-4}$ hydrocarbons.

The membranes of this invention are useful for many different gas separation applications, including, but not limited to, providing of an enriched nitrogen stream for inerting of flammable fluids, perishable foodstuffs, and heat treatment of metals, providing an enriched oxygen stream for medical uses, fermentation processes, or enhanced combustion processes, recovering carbon dioxide from light hydrocarbons, treating flue gases to remove nitrogen oxides and sulfur oxides, removing organic vapors from air, dehydrating air and natural gas, and the like.

For gas separation, the operating temperature for such applications is preferably between about −20° and 100° C., more preferably between 5° and 60° C., and the operating pressure is preferably between about 10 and 1000 psi. (69 and 6895 kPa), more preferably between about 50 and 500 psi. (345 and 3447 kPa).

The membranes of this invention may be operated in any configuration or combination, including, but not limited toy parallel, series, recycle, or cascade operations. These hollow fiber membrane devices may also be operated in conjunction with other separation processes or unit operations including, but not limited to, cryogenic distillation, pressure or temperature swing adsorption, liquid absorption, and the like.

SPECIFIC EMBODIMENTS

The following examples are for purposes of illustration only and are not intended to limit the scope of the invention or claims.

EXAMPLE 1

Treatment of Tetrabromobisphenol A Polycarbonate Membranes At Standard Conditions Casting solutions were prepared from mixtures containing about 15.00 grams tetrabromobisphenol A polycarbonate (TBBA PC) in about 75.00 grams methylene chloride and about 10.00 grams 1,2-dichloroethane. The mixtures were stirred for 2-12 hours to form substantially uniform solutions which were filtered through 3 micron filters. The polymer solutions were cast onto clean glass plates with a 6 or 10 mil doctor blade. After casting, the films were covered within about 5 seconds with a second clean glass plate, using metal washers as spacers between the plates. The entire casting assemblies were then covered with an air diffuser box to cause slow, even evaporation of solvent from the cast films. After about 2 hours at ambient temperature, the glass plates with the films were immersed in ambient temperature distilled water to facilitate film separation from the plates. The films were then dried in an oven for about 2 hours at about 50° C.

The dried films, which had thicknesses of about 10 to 60 microns, were used to make sample discs about 1.7 inches (4.4 centimeters) in diameter. Samples were reserved as controls, while other samples were subjected to heat treatment and/or UV irradiation treatment.

Heat treatment conditions were for about 2 hours at about 180° C. and UV irradiation exposures were for about 20 minutes. The UV radiation source having a wavelength of 200-600 nanometers was an ACE Hanovia mercury vapor lamp with reflector having a 450 Watt power supply. The membrane samples were placed at a distance of about 22 centimeters from the UV radiation source and irradiated on one side only. The radiant power striking the samples was about 100 mW.

The membranes were then evaluated for the separation of oxygen/nitrogen using the constant-volume variable-pressure method. The feed side of the membrane was pressurized with a single gas (oxygen or nitrogen) at about 50 psig and at 25° C. as the feed gas. Data are reported for the samples in Table I. The membranes which received both heat treatment and UV radiation treatment possessed significantly higher selectivities than the control membrane, or the membranes which received only heat treatment or only UV irradiation treatment. In addition, the heat and UV treated membranes exhibited minimal loss in permeability compared to the control membrane.

TABLE I

Tetrabromobisphenol A Polycarbonate Membranes

| Sample | Treatment | Oxygen/Nitrogen Selectivity | Oxygen Permeability (Barrers) |
|---|---|---|---|
| 1A | Control | 6.90 | 1.08 |
| 1B | Heat at 180° C. only | 7.40 | 0.94 |
| 1C | UV at 20 min. only | 7.94 | 1.00 |
| 1D | Heat at 180° C. + UV at 20 min. | 9.26 | 0.88 |
| 1AA | Control | 6.97 | 1.12 |
| 1BB | Heat at 180° C. only | 8.18 | 0.99 |
| 1CC | UV at 20 min. only | 7.87 | 1.01 |
| 1DD | Heat at 180° C. + UV at 20 min. | 9.26 | 0.90 |

EXAMPLE 2

Treatment of Tetrachlorohexafluorobisphenol A Polycarbonate Membranes At Standard Conditions Tetrachlorohexafluorobisphenol A polycarbonate (TCHF PC) membranes were prepared and treated in a manner similar to that described in Example 1. Data are reported for the samples in Table II. The membranes which received both heat treatment and UV irradiation treatment possessed significantly higher selectivities than the control membrane, or the membranes which received only heat treatment or only UV irradiation treatment. In addition, the heat and UV treated membranes exhibited only a 24 percent decrease in permeability compared to the control membrane.

TABLE II

Tetrachlorohexafluorobisphenol A Polycarbonate Membranes

| Sample | Treatment | Oxygen/Nitrogen Selectivity | Oxygen Permeability (Barrers) |
|---|---|---|---|
| 2A | Control | 4.95 | 8.99 |
| 2B | Heat at 180° C. only | 5.72 | 7.86 |
| 2C | UV at 20 min. only | 5.22 | 9.65 |
| 2D | Heat at 180° C. + UV at 20 min. | 5.96 | 6.80 |

EXAMPLE 3

Treatment of Polyethersulfone Membranes

Membranes from polyethersulfone, Victrex 600P from ICI, were prepared and treated in a manner similar to that described in Example 1, except that the UV irradiation time was 45 minutes. Data are reported for the samples in Table III. The combined heat and UV irradiation treatment increased the selectivity significantly over the untreated membrane, with only a slight decrease in permeability.

TABLE III

Polyethersulfone Membranes

| Sample | Treatment | Oxygen/Nitrogen Selectivity | Oxygen Permeability (Barrers) |
|---|---|---|---|
| 3A | Control | 5.79 | 0.47 |
| 3B | Heat at 180° C. only | 3.06 | 0.53 |
| 3C | UV at 45 min. only | — | — |
| 3D | Heat at 180° C. + UV at 45 min. | 9.38 | 0.36 |

EXAMPLE 4

Treatment Of Polysulfone Membranes

Membranes from polysulfone, Udel P1700 from Amoco, were prepared and treated in a manner similar to that described in Example 1, except that the heat treatment temperature was either 120° C. or 160° C., and the UV irradiation time was 45 minutes. In addition, for Sample 4E, the order of treatment was reversed: the membrane was first UV irradiated for 30 minutes, and then heat treated at 120° C. Data are reported for the samples in Table IV. The combined heat and UV irradiation treatment resulted in membranes with higher selectivities than heat treatment alone. The membrane which was UV irradiated and then heat treated (4E), did not exhibit the high selectivity of the sample which was first heat treated and then UV irradiated (4G).

TABLE IV

Polysulfone Membranes

| Sample | Treatment | Oxygen/Nitrogen Selectivity | Oxygen Permeability (Barrers) |
|---|---|---|---|
| 4A | Control | — | — |
| 4B | Heat at 120° C. only | 6.27 | 0.62 |
| 4C | UV at 30 min. only | 7.47 | 0.61 |
| 4D | Heat at 120° C. + UV at 45 min. | 7.87 | 0.49 |
| 4E | UV at 30 min. + heat at 120° C. | 5.98 | 0.57 |
| 4F | Heat at 160° C. only | 5.43 | 0.76 |
| 4G | Heat at 160° C. + UV at 45 min. | 7.80 | 0.51 |

EXAMPLE 5

Treatment Of Polystyrene Membranes

Membranes from polystyrene, Styron 685 from Dow Chemical, were prepared and treated in a manner similar to that described in Example 1, except that the heat treatment temperature was 80° C. and the UV irradiation time was either 30 minutes or 60 minutes. Data are reported for the samples in Table V. The combined heat and UV irradiation treatment resulted in membranes with higher selectivities than heat treatment alone.

TABLE V

Polystyrene Membranes

| Sample | Treatment | Oxygen/Nitrogen Selectivity | Oxygen Permeability (Barrers) |
|---|---|---|---|
| 5A | Control | 5.94 | 2.49 |
| 5B | Heat at 80° C. only | 6.30 | 1.79 |
| 5C | UV at 30 min. only | 6.26 | 1.98 |
| 5D | Heat at 80° C. + UV at 30 min. | 6.51 | 1.72 |
| 5E | Heat at 80° C. + UV at 60 min. | 9.30 | 1.17 |

EXAMPLE 6

Treatment Of Polyester Membranes

Membranes from polyester, Ardel D-100 from Union Carbide, were prepared and treated in a manner similar to that described in Example 1, except that the heat treatment temperature was 100° C. and the UV irradiation time was 45 minutes. Data are reported for the samples in Table VI. The combined heat and UV irradiation treatment resulted in membranes with higher selectivities than heat treatment alone.

TABLE VI

Polyester Membranes

| Sample | Treatment | Oxygen/Nitrogen Selectivity | Oxygen Permeability (Barrers) |
|---|---|---|---|
| 6A | Control | — | — |
| 6B | Heat at 100° C. only | 4.62 | 1.04 |
| 6C | Heat at 100° C. + UV at 45 min. | 4.86 | 0.92 |

EXAMPLE 7

Treatment Of Bisphenol AP Polycarbonate Membranes

Bisphenol AP polycarbonate (BAP PC) may be synthesized by the following procedure. To the reactor is added water, about 300 milliliters, Bisphenol-AP, about 50 grams, para-tert-butylphenol (PTBP), about 0.827 grams, methylene chloride, about 188 milliliters, and 50 percent NaOH, about 33.8 grams. Reaction pH is 13.5 and is maintained at 12.2–12.7 throughout the phosgenation by adding 50 percent NaOH as necessary. The reaction mixture is vigorously stirred and phosgene, about 26 grams, is added. After the phosgene has been added a drop of the aqueous phase is placed on a petri dish and acidified to a pH of 1 with 1N HCl. A precipitate indicates that monomer is still presents so more phosgene is added until there is no precipitate.

Next, a drop of the organic phase is combined with one drop of 0.25 percent nitrobenzylpyridine in tetrahydrofuran. Orange color formation indicates the presence of chloroformates, whereas a colorless solution indicates no chloroformates. Assuming chloroformates are present, additional methylene chlorides about 188 milliliters, is added to the reaction mixture followed by triethylamine, about 120 milliliters. The reaction mixture is allowed to stir for 10 minutes while maintaining the pH at about 12.0. The organic layer is analyzed for chloroformates and if there is none, the reaction pH is reduced to 2, by carefully adding 1N HCl. (At a pH of about 8–9, bicarbonate begins decomposing to give off $CO_2$, so caution is advised.) The aqueous phase is separated off and the organic layer washed with water, 2 volumes of about 250 milliliters. The washed polymer is recovered using a hot water devolatilizer. Membranes from BAP PC were prepared and treated in a manner similar to that described in Example 1, except that the membranes were UV treated only. Data are reported for the samples in Table VII.

TABLE VII

Bisphenol AP Polycarbonate Membranes

| Sample | Treatment | Oxygen/Nitrogen Selectivity | Oxygen Permeability (Barrers) |
|---|---|---|---|
| 7A | Control | 5.63 | 1.29 |
| 7B | UV at 20 min. only | 5.96 | 1.05 |

EXAMPLE 8

Treatment Of Polybenzoxazole Membranes

Polybenzoxazole (PBO) may be synthesized by the following procedure. A mixture of about 258 grams of 81 percent polyphosphoric acid (PPA) and 10.00 grams of diaminoresorcinol dihydrochloride (DAR) is placed in a 500 milliliter resin kettle. The resin kettle is equipped with a nitrogen inlet, silicone oil heating bath, stainless-steel stirring shaft, and a high-torque stirrer. The mixture is heated at about 110° C. for 16 hours. At this time, about 89 grams of phosphorous pentoxide ($P_2O_5$) and 15.23 grams of 1,1,3-trimethyl-3-phenylindan-4,5'-dicarboxylic acid (PIDA) is added. The reactants are heated according to the following schedule: about 7 hours at 110° C., 16 hours at 150° C., 24 hours at 180° C., and 24 hours at 190° C. The crude polymer is isolated by precipitating into water, vacuum filtrating, washing with hot water and methanol, and finally drying in a vacuum oven. The polymer is soluble in m-cresol, trifluoroacetic acid, and methane sulfonic acid. PBO membranes were prepared and treated in a manner similar to that described in Example 1, except that the membranes were UV irradiated for 10 minutes only. Data are reported for the samples in Table VIII.

TABLE VIII

Polybenzoxazole Membranes

| Sample | Treatment | Oxygen/Nitrogen Selectivity | Oxygen Permeability (Barrers) |
|---|---|---|---|
| 8A | Control | 5.34 | 12.25 |
| 8B | UV at 10 min. only | 6.21 | 9.11 |

EXAMPLE 9

Treatment of TBBA PC Membranes At Various Conditions

TBBA PC membranes were prepared and treated in a manner similar to that described in Example 1, except that the membranes were heat treated at different temperatures and irradiated at different times. Data are reported in Table IX.

TABLE IX

Tetrabromobisphenol A Polycarbonate Membranes

| Sample | Heat Temperature °C. | UV time (minutes) | Oxygen/Nitrogen Selectivity | Oxygen Permeability (Barrers) |
|---|---|---|---|---|
| 11A | 25 | 0 | 6.93 | 1.16 |
| 11B | 25 | 30 each side | 7.57 | 0.57 |
| 11C | 60 | 0 | 5.91 | 1.25 |
| 11D | 60 | 20 | 6.87 | 1.11 |
| 11E | 60 | 30 | 6.72 | 1.16 |
| 11F | 120 | 0 | 6.78 | 1.13 |
| 11G | 120 | 20 | 7.44 | 0.97 |
| 11H | 120 | 30 | 7.44 | 0.94 |
| 11I | 180 | 0 | 7.98 | 1.17 |
| 11J | 180 | 15 | 8.37 | 1.20 |
| 11K | 180 | 20 | 8.23 | 1.03 |
| 11L | 180 | 30 | 8.75 | 1.06 |
| 11M | 180 | 35 | 9.06 | 0.75 |
| 11N | 180 | 45 | 9.41 | 0.77 |
| 11O | 180 | 30 each side | 9.90 | 0.74 |
| 11P | 180 | 20 one side + 30 each side | 10.19 | 0.70 |
| 11Q | 230 | 0 | 8.69 | 1.05 |
| 11R | 230 | 90 | 11.52 | 0.59 |

Comparative Example 10

Treatment Of TBBA PC Membranes By First UV Irradiating And Then Heating

This Example is for comparative purposes and is not illustrative of the invention.

TBBA PC membranes were prepared in a manner similar to that described in Example 1. However, the membranes were first exposed to UV irradiation for 30–60 minutes and then heat treated for about 2 hours at about 180° C. Data are reported in Table X. The membrane samples which were first exposed to UV irradiation and then heat treated did not differ significantly in selectivity or permeability compared to the control samples.

TABLE X

Tetrabromobisphenol A Polycarbonate Membranes

| Sample | UV Time (minutes) | Heat (°C.) | Oxygen/Nitrogen Selectivity | Oxygen Permeability (Barrers) |
|---|---|---|---|---|
| 12A | 0 | 25 | 7.98 | 1.17 |
| 12B | 30 | 180 | 7.50 | 1.36 |
| 12C | 40 | 180 | 8.13 | 1.06 |
| 12D | 45 | 180 | 7.94 | 1.13 |
| 12E | 30 each side | 180 | 8.03 | 0.83 |

Comparative Example 11

Treatment Of TBBA PC Membranes By UV Irradiating Under Nitrogen

This Example is for comparative purposes and is not illustrative of the invention.

TBBA PC membranes were prepared and treated in a manner similar to that described in Example 1, except that UV irradiation was performed under a nitrogen atmosphere. Data for the samples are reported in Table XI. The membrane samples which were UV irradiated under nitrogen did not differ significantly in selectivity or permeability compared to the control samples.

TABLE XI

Tetrabromobisphenol A Polycarbonate Membranes

| Sample | Treatment | Oxygen/Nitrogen Selectivity | Oxygen Permeability (Barrers) |
|---|---|---|---|
| 13A | Control | 7.98 | 1.17 |
| 13B | Nitrogen atmosphere | 8.18 | 1.31 |

TABLE XI-continued

| | Tetrabromobisphenol A Polycarbonate Membranes | | |
|---|---|---|---|
| Sample | Treatment | Oxygen/ Nitrogen Selectivity | Oxygen Permeability (Barrers) |
| | + UV | | |

EXAMPLE 11

Treatment of Polystyrene Composite Membranes

Composite polystyrene membranes, having intermediate layers of polytrimethylsilylpropyne and silicone on a microporous polysulfone support was prepared by the following procedure.

Ten parts of General Electric silicone RTV 615 Part A and one part General Electric silicone RTV 615 Part B were combined, pre-gelled by heating at 35° C. for 80 minutes, then diluted with heptane to form a 12 percent solution. The silicone solution was coated onto a microporous polysulfone on polyester substrate membrane (obtained from FilmTec Corporation) using a gravure coating machine by the direct gravure method with a 180 Quadrangular roll, a line speed of 4 feet/min. (1.2 meters/min.), an impression pressure of 10 psi. (69 kPa), and an oven temperature of 225° F. (107° C.).

A 0.75 percent by weight solution of polytrimethylsilylpropyne (PTMSP) in heptane was prepared and filtered through glass wool. The solution was applied to the silicone/polysulfone substrate by dip-coating on a gravure coating machine at a line speed of 2 feet/min. (0.6 meters/min.) at an oven temperature of 225° F. (107° C.).

A 2 percent by weight solution of polystyrene in amyl acetate was prepared and filtered through a 0.2μ polytetrafluoroethylene filter. The polystyrene solution was dip coated onto the PTMSP/silicone/polysulfone substrate using a small hand-operated coating machine. The solvent was allowed to evaporate at room temperature and the membrane was then heated in a 60° C. oven overnight.

The membrane was UV irradiated for 1 or 3 minutes in a manner similar to that described in Example 1. Data are reported in Table XI.

TABLE XI

| | Polystyrene Composite Membranes | | | |
|---|---|---|---|---|
| UV Time (min.) | Oxygen Flux $\frac{cm^3 (stp)}{cm^2 sec\ cmHg}$ | | Oxygen/ Nitrogen Selectivity | |
| | Before | After | Before | After |
| 3 | $3.7 \times 10^{-6}$ | $3.6 \times 10^{-6}$ | 5.5 | 6.5 |
| 3 | $3.9 \times 10^{-6}$ | $3.3 \times 10^{-6}$ | 5.5 | 5.9 |
| 1 | $9.4 \times 10^{-6}$ | $9.5 \times 10^{-6}$ | 5.4 | 6.0 |
| 1 | $3.6 \times 10^{-6}$ | $3.7 \times 10^{-6}$ | 5.7 | 6.9 |

EXAMPLE 12

Treatment of Tetrabromofluorene Containing Polycarbonate Composite Membranes

A composite membrane having a discriminating layer of tetrabromofluorene containing polycarbonate (TBF PC), an intermediate layer of polytrimethylsilylpropyne, and a support layer of microporous nylon was prepared.

The TBF PC may be prepared by the following procedure. A three necked 0.5 liter round bottom flask equipped with a condenser, phosgene/nitrogen inlet, and a paddle stirrer connected to a Cole Parmer servodyne is charged with about 237 cubic centimeters of methylene chloride, 30.80 grams (0.046 moles) of 9,9-bis(3,5-dibromo-4-hydroxy-phenyl)fluorene, and 10.9 grams (0.138 moles) of pyridine. The resultant clear solution is stirred under a nitrogen atmosphere and about 4.6 grams (0.046 moles) of phosgene are bubbled into the reaction mixture over a period of about 7 minutes. An additional quantity of about 1.0 gram (0.010 moles) of phosgene is bubbled in over about 18 minutes and the reaction mixture is stirred for about 16 hours. The reaction mixture is then scavenged with methanol, diluted with about 50 cubic centimeters of methylene chloride, washed twice with dilute hydrochloric acid, and then passed through DOWEX MSC-1 ion exchange resin. The polymer is isolated by adding the methylene chloride solution of polymer to a mixture of hexane/acetone. The precipitated polymer is dried under vacuum at about 120° C. for about 48 hours. The resultant polycarbonate is found to have an inherent viscosity of about 0.48 dL/g at 25° C. in methylene chloride.

A 0.75 percent by weight solution of PTMSP in heptane was prepared and filtered through glass wool. The solution Was applied to a 0.04μ pore size Zetapor reinforced nylon substrate (obtained from CUNO Inc.) by dip-coating on a gravure coating machine at 2 feet/min. (0.6 meters/min.) line speed and 225° F. (107° C.) oven temperature. An 8 percent by weight solution of TBF PC in cyclopentanone was prepared and filtered through a 0.2μ polytetrafluoroethylene filter. The solution was hand cast onto the PTMSP/nylon substrate using a 1 mil doctor blade. The solvent was allowed to evaporate at room temperature and the membrane was then heated in a 60° C. oven overnight. The membrane was UV irradiated for 3 minutes in a manner similar to that described in Example 1. Data are reported in Table XII.

TABLE XII

| | Tetrabromofluorene Polycarbonate Membranes | | | |
|---|---|---|---|---|
| UV Time (min.) | Oxygen Flux $\frac{cm^3 (stp)}{cm^2 sec\ cmHg}$ | | Oxygen/ Nitrogen Selectivity | |
| | Before | After | Before | After |
| 3 | $4.6 \times 10^{-6}$ | $5.0 \times 10^{-6}$ | 5.9 | 11.3 |
| 3 | $4.6 \times 10^{-6}$ | $4.9 \times 10^{-6}$ | 6.1 | 9.8 |
| 3 | $6.3 \times 10^{-6}$ | $6.5 \times 10^{-6}$ | 5.9 | 7.5 |

What is claimed is:

1. A process for treating a gas separation membrane to improve its selectivity, comprising:
   A. first heating a membrane comprising a polymer having a UV excitable site and a labile protonic site in the polymeric backbone, such that a covalent bond is formed between said sites, at a temperature between about 60° and 300° C. for a time sufficient to relax excess free volume in the polymer; and
   B. the irradiating the membrane with a UV radiation source in the presence of oxygen for a time sufficient to surface oxidize the membrane to obtain treated membrane;
   wherein the treated membrane exhibits at least a 10 percent increase in selectivity with less than a 60 percent decrease in permeability compared to the untreated membrane and wherein the membrane comprises an unsubstituted or substituted polycarbonate, polyestercarbonate, polyester, polystyrene, polysulfone, polyethersulfone, polyether, polyarylester, polyethylene terephthalate, cellulose ester, polybenzazole, polyurethane, or copolymer or physical blend thereof.

2. The process of claim 1 wherein the membrane comprises an unsubstituted or substituted polycarbonate, polybenzazole, polyestercarbonate, polyester, polysulfone, polyethersulfone, polyether, polyarylester, or copolymer or physical blend thereof.

3. The process of claim 2 wherein the membrane comprises polybenzazole or a polymer containing 9,9-bis(3,5-dibromo-4-hydroxyphenyl)fluorene, 9,9-bis(3,5-dichloro-4-hydroxyphenyl)fluorene, hexafluorobisphenol A, tetrahalohexafluorobisphenol A, or tetraalkyl-hexafluorobisphenol A moieties selected from the group consisting of polyether, polysulfone, polyethersulfone, polyarylester, polyester, polyestercarbonate, polycarbonate, and copolymers and physical blends thereof.

4. The process of claim 1 wherein the membrane is a film.

5. The process of claim 1 wherein the membrane is a hollow fiber.

6. The process of claim 1 wherein the membrane is a composite.

7. The process of claim 1 wherein the heating occurs at a temperature of between about 100° and 250° C.

8. The process of claim 7 wherein the heating occurs for a time between about 0.5 and 24 hours.

9. The process of claim 8 wherein the UV irradiating occurs at a wavelength of between about 180 and 400 nanometers.

10. The process of claim 9 wherein the UV irradiating occurs for a time between about 1 and 90 minutes.

11. The process of claim 10 wherein the treated membrane exhibits an increase in selectivity of at least about 30 percent compared to the untreated membrane for at least one gas pair selected from the group consisting of oxygen/nitrogen, carbon dioxide/methane, hydrogen/a light hydrocarbon, helium/methane, and nitrogen/methane.

12. The process of claim 11 wherein the treated membrane exhibits a decrease in permeability of less than about 40 percent for at least one gas selected from the group consisting of helium, oxygen, nitrogen, carbon dioxide, methane, hydrogen, and a light hydrocarbon.

13. The process of claim 12 wherein the treated membrane exhibits a selectivity for oxygen/nitrogen at about 30° C. of at least about 7.5.

14. The process of claim 13 wherein the treated membrane exhibits a permeability for oxygen of at least about 0.5 barrers.

15. A gas separation membrane formed by the process of claim 1.

16. A gas separation membrane comprising a thin discriminating layer comprising a polymer selected from the group consisting of an unsubstituted or substituted polycarbonate, polyestercarbonate, polyester, polystyrene, polysulfone, polyethersulfone, polyether, polyarylester, polyethylene teraphthalate, polybenzazole, polyurethane, or copolymer or physical blend thereof, which exhibits at least a 10 percent increase in selectivity with less than a 60 percent decrease in permeability after exposure to heat and UV irradiation to form a treated membrane compared to an untreated membrane.

* * * * *